(12) United States Patent
Fischer

(10) Patent No.: US 11,053,969 B2
(45) Date of Patent: Jul. 6, 2021

(54) DEFORMABLE INSERTION FASTENING ARRANGEMENT FOR FASTENING ONTO A METAL SHEET/PLASTIC COMPOSITE PLY STRUCTURE

(71) Applicant: Röchling Automotive SE & Co. KG, Mannheim (DE)

(72) Inventor: Jochem Fischer, Ostfildern (DE)

(73) Assignee: Röchling Automotive SE & Co. KG, Mannheim (DE)

( * ) Notice: Subject to any disclaimer, the term of this patent is extended or adjusted under 35 U.S.C. 154(b) by 159 days.

(21) Appl. No.: 16/297,083

(22) Filed: Mar. 8, 2019

(65) Prior Publication Data
US 2019/0301506 A1    Oct. 3, 2019

(30) Foreign Application Priority Data
Mar. 29, 2018 (DE) ..................... 10 2018 204 878.9

(51) Int. Cl.
*F16B 39/00* (2006.01)
*F16B 13/06* (2006.01)
*F16B 37/06* (2006.01)

(52) U.S. Cl.
CPC .......... *F16B 13/063* (2013.01); *F16B 37/065* (2013.01)

(58) Field of Classification Search
CPC . F16B 13/063; F16B 13/0866; F16B 13/0875
(Continued)

(56) References Cited

U.S. PATENT DOCUMENTS 282,501 A * 8/1883 Cornell ................. F16B 13/066
411/65
843,271 A * 2/1907 Hanlon ............... F16B 13/0833
411/32
(Continued)

FOREIGN PATENT DOCUMENTS

CN          1205056 A     1/1999
CN        101008418 A     8/2007
(Continued)

OTHER PUBLICATIONS

German Search Report for corresponding DE 10 2018 204 878.9 dated Jan. 7, 2019, 10 pgs.
(Continued)

*Primary Examiner* — Gary W Estremsky
(74) *Attorney, Agent, or Firm* — Rankin, Hill & Clark LLP

(57) ABSTRACT

A deformable insertion fastening arrangement for insertion into a planar ply structure and for retention thereon by subsequent deformation, including a retention component having a passthrough opening passing through it along a passthrough axis and having a fastening configuration for fastening a further component thereonto; the retention component having at least two portions that are radially displaceable relative to the notional passthrough axis that passes centrally through the passthrough opening, the retention component, when considered in its undeformed initial state, is embodied segmentedly in a circumferential direction around the passthrough axis; at least two segments, constituting the radially displaceable portions, being connected to one another by at least one connecting configuration deformable in a circumferential direction; at least one segment being displaceable in a radial direction away from the passthrough axis against a shape inertia force of the at (Continued)

least one connecting configuration, accompanied by enlargement of the passthrough opening.

14 Claims, 4 Drawing Sheets

(58) Field of Classification Search
USPC .......... 411/60.2, 64, 65, 80.5, 141–143, 176, 411/182, 433
See application file for complete search history.

(56) References Cited

U.S. PATENT DOCUMENTS

| | | | | |
|---|---|---|---|---|
| 849,271 | A * | 2/1907 | Hanlon | |
| 1,021,794 | A * | 4/1912 | Pleister | F16B 13/04 411/21 |
| 1,066,227 | A * | 7/1913 | Rosenberg | F16B 13/066 411/64 |
| 2,033,100 | A * | 3/1936 | Kellogg | E04B 2/62 52/242 |
| 4,293,259 | A * | 10/1981 | Liebig | F16B 13/0833 411/32 |
| 4,501,520 | A * | 2/1985 | Bergner | F16B 13/065 411/21 |
| 4,614,471 | A * | 9/1986 | Mauritz | F16B 13/128 405/259.3 |
| 4,717,612 | A * | 1/1988 | Shackelford | B32B 3/12 428/116 |
| 4,861,198 | A * | 8/1989 | Stankus | E21D 20/025 405/259.3 |
| 5,018,908 | A * | 5/1991 | Laphon | F16B 13/066 405/259.1 |
| 5,178,501 | A * | 1/1993 | Carstairs | B62D 25/163 24/297 |
| 5,682,678 | A * | 11/1997 | Gallagher | F16B 5/01 29/402.15 |
| 5,846,041 | A * | 12/1998 | Bevan | F16B 13/066 411/65 |
| 6,712,572 | B2 * | 3/2004 | Bisping | F16B 13/0825 411/60.1 |
| 7,008,159 | B2 * | 3/2006 | Dendo | F16B 5/0258 411/182 |
| 7,179,033 | B2 * | 2/2007 | Ghiran | F16B 37/062 411/179 |
| 7,222,829 | B2 | 5/2007 | Takahashi | |
| 8,684,321 | B2 * | 4/2014 | Shirakabe | F16B 37/0842 248/74.1 |
| 8,827,585 | B2 | 9/2014 | Figge et al. | |
| 8,979,454 | B2 * | 3/2015 | Howe | F16B 37/12 411/71 |
| 9,074,614 | B2 | 7/2015 | Schwarzbich et al. | |
| 9,175,716 | B2 | 11/2015 | Babej et al. | |
| 9,409,441 | B2 | 8/2016 | Mayer Pujadas et al. | |
| 9,567,037 | B2 * | 2/2017 | Preisler | B63B 73/46 |

FOREIGN PATENT DOCUMENTS

| | | |
|---|---|---|
| CN | 103122897 B | 5/2013 |
| CN | 102654154 B | 8/2016 |
| CN | 105102237 A | 10/2017 |
| DE | 102004042478 A1 | 3/2006 |
| FR | 2757581 A1 | 6/1998 |
| GB | 991487 A | 5/1965 |

OTHER PUBLICATIONS

Espacenet Bibliographic data:FR 2 757 581 (A1), Published Jun. 26, 1998, 1pg.
Espacenet Bibliographic data:DE 10 2004 042 478 (A1), Published Mar. 30, 2006, 1pg.
Chinese Office Action for CN 201910114049.2 dated Jul. 30, 2020, 6 pages.
Espacenet Bibliographic data:CN 1205056 (A), Published Jan. 13, 1999, 1pg.

* cited by examiner

DEFORMABLE INSERTION FASTENING ARRANGEMENT FOR FASTENING ONTO A METAL SHEET/PLASTIC COMPOSITE PLY STRUCTURE

The present invention relates to a deformable insertion fastening arrangement that is embodied to be inserted into a planar metal sheet/plastic composite ply structure and to be retained thereon by subsequent deformation. The insertion fastening arrangement comprises a retention component having a passthrough opening passing through it along a passthrough axis. The passthrough opening in turn comprises a fastening configuration for fastening a further component onto the retention component. The passthrough axis defines a cylindrical coordinate system having an axial direction proceeding along the passthrough axis, having radial directions orthogonal to the passthrough axis, and having a circumferential direction proceeding around the passthrough axis. The retention component comprises at least two portions that are radially displaceable relative to the notional passthrough axis that passes centrally through the passthrough opening.

BACKGROUND OF THE INVENTION

A fastening arrangement of this kind, referred to as a "press nut" or "rivet nut," is known in the existing art. These special nuts are often used, however, as a fastening arrangement in solid structures, such as panels and the like, and not so much for retention on planar metal sheet/plastic composite ply structures. We refer to the example of DE 10 2004 042 478 A1 as one possible document of the existing art which defines the species.

"Planar" means for purposes of the present Application that the thickness direction of the composite ply structure is by far the smallest dimension of the composite ply structure. Along the two principal dimension directions that are orthogonal both to one another and each to the thickness direction, the composite ply structure has dimensions many times greater than in its thickness direction. The composite ply structure need not be flat; it can have a simple or compound curvature around one or several (including different) axes of curvature, and can thus form a three-dimensional shape. In many cases it is curved in such a way as to stiffen it. Because of its material construction, however, the composite ply structure remains a planar structure.

Planar metal sheet/plastic composite ply structures are being used increasingly in automobile construction, but also in other technical fields, as planar structural components. The metal sheet used in such composite ply structures is often made of aluminum, and has a thickness of no more than 1.4 mm, preferably no more than 1 mm. The plastic ply of the composite structure is preferably constituted from a porous fiber-reinforced thermoplastic, preferably a so-called "low weight reinforced thermoplastic" (LWRT). Typical metal sheet/plastic composite ply structures are sandwich structures in which a plastic ply, made in particular of a fiber-reinforced thermoplastic, is arranged between two metal sheets. As structural components, such composite ply structures not only must have sufficient inherent rigidity but also must be able to support further components. The inherent rigidity and structural stability of the planar composite ply structures is less problematic than tearout-proof fastening of further components onto them.

SUMMARY OF THE INVENTION

An object of the present invention is therefore to describe a fastening arrangement that makes possible, in a simple, reliable, rapid, and permanent manner, fastening of a further component onto a planar metal sheet/plastic composite ply structure.

This object is achieved according to the present invention by an insertion fastening arrangement of the kind recited previously in which the retention component, when considered in its undeformed or displacement-free initial state, is embodied segmentedly in a circumferential direction around the passthrough axis; at least two segments being connected to one another by at least one connecting configuration deformable in a circumferential direction; at least one segment being displaceable in a radial direction away from the passthrough axis against a shape inertia force of the at least one connecting configuration, accompanied by enlargement of the passthrough opening; and/or in which the retention component, when considered in its undeformed or displacement-free initial state, comprises, in at least one anchoring portion delimited with reference to the overall dimension of the retention component in an axial direction and in a circumferential direction, an anchoring configuration that projects radially into the passthrough opening and is displaceable in a radial direction accompanied by formation of a radial protrusion on the radially outer side of the retention component.

In use as intended, the insertion fastening arrangement is inserted into a prepared insertion opening in the metal sheet/plastic composite ply structure and is then anchored on the composite ply structure by deformation there. Unless explicitly stated otherwise in the present Application, the insertion fastening arrangement is described therein in its undisplaced and/or undeformed state in which it is inserted into the insertion opening.

The insertion opening can be a blind opening or an opening that passes completely through the composite ply structure in its thickness direction.

The insertion fastening arrangement, and preferably the retention component thereof, comprises at least one axial portion that is embodied rotationally asymmetrically with reference to the passthrough axis, so that a torque around the passthrough axis can be braced at that axial portion by way of a tool engagement and/or by abutment against a complementarily embodied edge of the insertion opening in the composite ply structure. Bolts that constitute the aforementioned further component can thereby be fastened in the passthrough opening.

The connecting configuration can be embodied in one piece with the segments that are connected by it. The connecting configuration can then comprise at least one connecting land or a plurality of connecting lands which interconnect segments that are adjacent in a circumferential direction. The at least one connecting land can span a circumferential gap that separates two immediately adjacent segments. The at least one connecting land can be left behind on an originally gap-free one-piece retention component in the context of manufacture of the circumferential gap, for example using a material-removing tool, and thereby produced in simple fashion.

With the exception of the connecting configuration that is possibly embodied in one piece with them, the segments are merely displaced but not deformed. The size of a circumferential region of the passthrough opening which is circumscribed by a segment thus remains the same during displacement of the segment. The passthrough opening as a whole nevertheless becomes enlarged because at least one segment is moved away from the passthrough axis, and thus from another segment, in a direction orthogonal to the passthrough axis.

In order to obtain an insertion fastening arrangement that is as compact as possible in a radial direction, according to an advantageous refinement of the present invention the connecting configuration can be arranged in a circumferential direction between two circumferential bounding walls of two segments that are directly adjacent in a circumferential direction. This has already been stated in the previous paragraph for the connecting configuration that is embodied in one piece with the segments that are connected by it. This also applies, however, to a connecting configuration that is not embodied in one piece with the segments that are connected by it. For example, the connecting configuration can encompass or be an elastomer that is introduced into a circumferential gap separating two directly adjacent segments, and can be connected to the two segments. The two segments can then be displaced against the material-inherent preload force of the elastomer accompanied by enlargement of the circumferential gap in a circumferential direction, the circumferential direction being the thickness direction of the circumferential gap.

Alternatively or additionally, the connecting configuration can radially externally surround the retention component at least in portions, preferably completely. The connecting configuration can then act as a spring component that can be stretched in a circumferential direction against its material elasticity. The connecting configuration can encompass, for example, one or several wire rings or a wire coil. In addition or alternatively to metal wire, the at least one ring surrounding the retention component, or a coil surrounding the retention component. can also be constituted from plastic. The material selection will be made as a function of the required strength, the required deformation resistance, and the installation space available.

For positively engaged anchoring of the insertion fastening arrangement on the composite ply structure, provision can be made that the retention component comprises, on its external region that faces toward the composite ply structure in an inserted position, a positive engagement configuration for positive engagement with the composite ply structure, in particular with a metal sheet thereof. The positive engagement configuration can encompass a plug that protrudes radially outward on the external region of the retention component and that, upon displacement of the segments in a radial direction away from one another or from the passthrough axis, is driven into the plastic ply of the composite ply structure. Alternatively or additionally, the positive engagement configuration can be embodied to come into abutting or positive engagement with one or several metal sheets of the composite ply structure upon displacement of the segments in a radial direction away from one another or from the passthrough axis. A positive engagement configuration embodied for anchoring engagement with the metal sheet is preferably embodied at one or both axial longitudinal ends of the retention component. The positive engagement configuration is preferably embodied in one piece with the retention component.

Alternatively or additionally, provision can be made that the anchoring portion comprises as the anchoring configuration an anchoring component that is embodied separately from the retention component and is mounted radially displaceably therein. The anchoring component, for example an anchoring wedge, is displaced radially outward for anchoring. After displacement, the anchoring component constitutes the aforementioned radial protrusion. A corresponding recess, into which the anchoring component is inserted, can be embodied in the retention component for reception of the anchoring component.

Alternatively or in addition to the anchoring component embodied separately from the retention component, the anchoring portion can comprise as the anchoring configuration a deformation portion embodied on the retention component in one-piece and materially continuous fashion. This deformation portion is displaced radially outward by deformation, with the result that a radial protrusion is generated. This radial protrusion is brought, by the deformation of the deformation portion, into engagement with the composite ply structure that radially externally surrounds the retention component. The deformability is furnished by appropriate material selection.

The anchoring portion is preferably provided on a non-segmented retention component, so that a force exerted on the anchoring portion can be deliberately used in order to form the radial protrusions and not also to displace parts of the segments away from the passthrough axis.

Both the aforementioned displacement of the segments and the displacement, if applicable by deformation, of the anchoring configuration in order to constitute the radial protrusion can be brought about by a suitable tool. The displacement of the segments and/or the displacement, if applicable by deformation, of the anchoring configuration is preferably brought about by the further component that is fastened onto the retention component.

For easier displacement of the anchoring configuration, it is advantageous if that portion of the anchoring configuration which projects into the passthrough opening comprises an actuation bevel that projects radially into the passthrough opening. The anchoring configuration can thus be displaceable radially outward by the further component introduced into the passthrough opening, accompanied by formation of the radial protrusion. As axial penetration of the further component into the passthrough opening proceeds, formation of the radial protrusion on the radially outer region of the retention component is thus effected mechanically by the actuation bevel, whether by displacement of the separate anchoring component and/or by deformation of the anchoring configuration.

For the preferred case of generally boltable fastening of the further component on the retention component, the fastening configuration is preferably embodied as a thread. The further component then can comprise at least one threaded-rod portion, preferably can be a bolt.

When the passthrough opening is embodied conically at least over an axial portion, the requisite displacement of the aforementioned segments and/or of the anchoring configuration can be effected by the further component which is to be fastened onto the retention component. The passthrough opening tapers in this context from that longitudinal end at which the at least one component is introduced into it, toward the axially oppositely located longitudinal end. The aforementioned actuation bevel preferably tapers in the same direction.

These and other objects, aspects, features and advantages of the invention will become apparent to those skilled in the art upon a reading of the Detailed Description of the invention set forth below taken together with the drawing which will be described in the next section.

BRIEF DESCRIPTION OF THE DRAWING

The invention may take physical form in certain parts and arrangement of parts, a preferred embodiment of which will be described in detail and illustrated in the accompanying drawing which form a part hereof and wherein.

DESCRIPTION OF PREFERRED EMBODIMENTS

Figure 1:
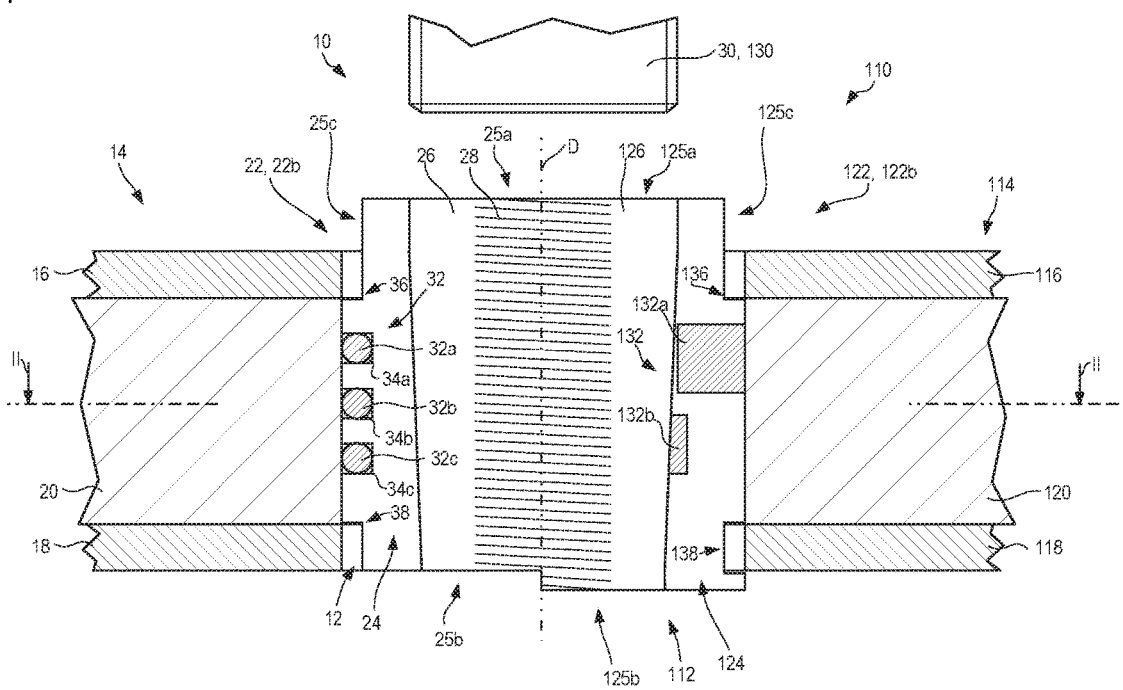
FIG. 1 is a longitudinal section view along section plane I-I in FIG. 2 which contains the passthrough axis, through two different embodiments of an insertion fastening arrangement according to the present invention having segments displaceable orthogonally to the passthrough axis.

Referring now to the drawing wherein the showings are for the purpose of illustrating preferred and alternative embodiments of the invention only and not for the purpose of limiting the same, FIG. 1 depicts, in longitudinal section, two embodiments according to the present invention of an insertion fastening arrangement of the present Application. A passthrough axis D, which is explained in detail below, is shown at the center of FIG. 1. A first embodiment of an insertion fastening arrangement according to the present invention is shown in FIG. 1 to the left of passthrough axis D, and a second embodiment to the right thereof.

Figure 2:
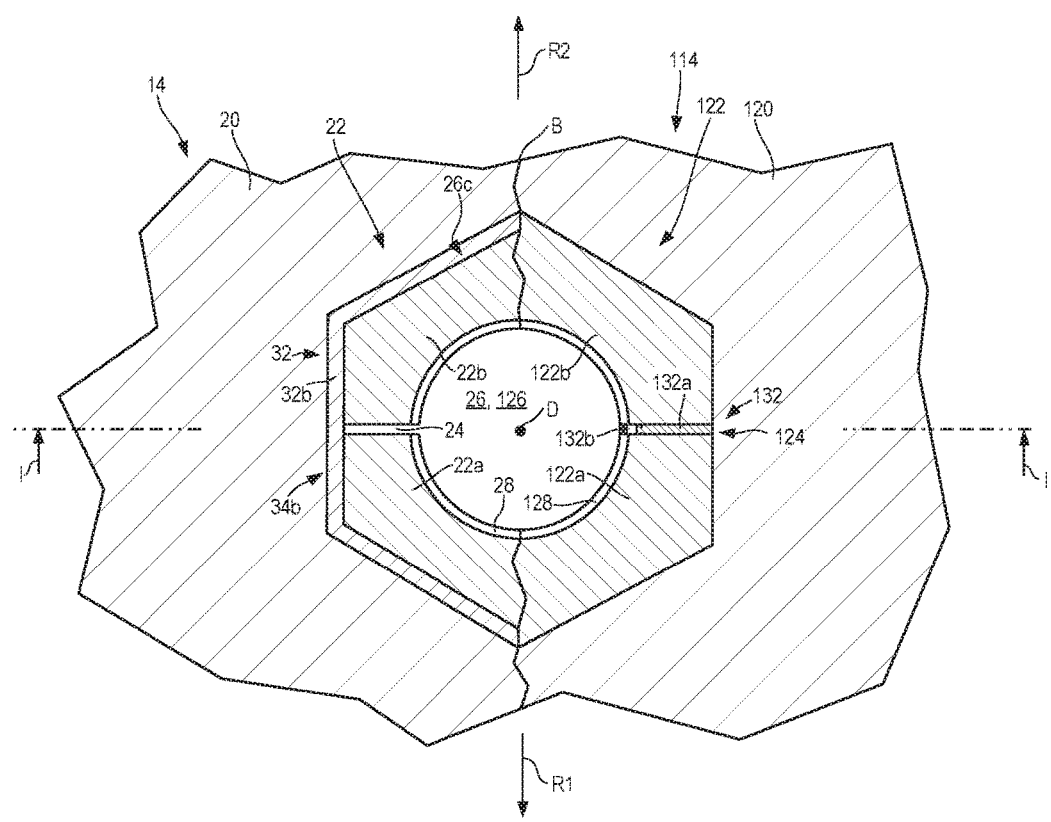
FIG. 2 is a cross-sectional view of the two embodiments of FIG. 1 along section plane II-II of FIG. 1 which is orthogonal to the passthrough axis.

The two embodiments of FIG. 1 are depicted in a cross-sectional view in FIG. 2, the cross-sectional view of the left embodiment of FIG. 1 also being shown in FIG. 2 to the left of dividing line B depicted therein, whereas the cross-sectional view of the right embodiment of FIG. 1 is shown in FIG. 2 to the right of dividing line B that is depicted.

The embodiment to the left in FIGS. 1 and 2 will be described first. The insertion fastening arrangement shown there is labeled in general with the number 10. It is depicted in a state in which it is inserted into a prepared opening 12 of a planar metal sheet/plastic composite ply structure 14 having a typical sandwich-like structure. The composite ply structure 14 encompasses two metal-sheet plies 16 and 18 having arranged between them a plastic ply 20 made of fiber-reinforced thermoplastic.

Fastening arrangement 10 encompasses a retention component 22 that comprises, in the exemplifying embodiment depicted, two segments 22*a* and 22*b* separated from one another by a circumferential gap 24 (see FIG. 2). Segments 22*a* and 22*b* enclose a passthrough opening 26 that extends around passthrough axis D.

Embodied on those surfaces of segments 22*a* and 22*b* which radially externally delimit passthrough opening 26 is an internal thread 28 that serves to receive a threaded rod 30 that can be threaded along passthrough axis D into passthrough opening 26 that constitutes the further component recited in the introductory part of the specification, and can thereby be fastened to retention component 22. Because passthrough opening 26 conically tapers in portions from its longitudinal end 25*a* located closer to threaded rod 30 to the oppositely located longitudinal end 25*b*, internal thread 28 is indicated by parallel oblique lines.

The two segments 22*a* and 22*b* are secured against removal from one another by a connecting configuration 32, proceeding completely around segments 22*a* and 22*b*, in the form of, for example, three uninterrupted wire rings 32*a*, 32*b*, and 32*c*. In the example depicted, wire rings 32*a*, 32*b*, and 32*c* are shown countersunk into grooves 34*a*, 34*b*, and 34*c*. The number of wire rings 32*a*, 32*b*, and 32*c* can of course differ from three. Wire rings 32*a*, 32*b*, and 32*c* can, however, also merely rest on an external surface of segments 22*a* and 22*b*. Countersinking into grooves has the advantage that the radial dimension of retention component 22 is not modified by the placement of wire rings 32*a*, 32*b*, and 32*c*.

Connecting configuration 32 is located axially between two positive engagement configurations 36 and 38 in the form of radial steps that are embodied for positive engagement with metal sheets 16 and 18 of composite ply structure 14. In detail, the axial spacing of the respective end surfaces, facing in opposite axial directions, of radial steps 36 and 38 is equal to or slightly less than the axial spacing of those surfaces of metal sheets 16 and 18 which face toward one another, so that when the two segments 22*a* and 22*b* are moved away from one another in a radial direction relative to one another as a result of the threading of threaded rod 30 into the conical passthrough opening 26, the end surfaces of radial steps 36 and 38 penetrate between the two metal sheets 16 and 18 accompanied by radial forced displacement of plastic ply 20 located between metal sheets 16 and 18, and retain retention component 22, by respective abutment against them, in axial pullout-prevented fashion relative to composite ply structure 14.

Retention component 22 comprises, at least at an axial region 25*c* that is in the vicinity of longitudinal end 25*a* and preferably contains said longitudinal end 25*a*, an external conformation that is rotationally asymmetrical with reference to passthrough axis D, for example an external hex conformation that is typical of bolt heads and nuts. This axial region 25*c* serves for tool engagement, for example using an open-end wrench, so that a torque can be braced upon threading of threaded rod 30 into internal thread 28. For that reason, axial region 25*c* preferably projects axially beyond composite ply structure 14 and is thus reachable by a tool. Retention component 22 can also comprise over its entire axial length a rotationally asymmetrical shape, in particular a hexagonal shape, on its external surface. The open-end wrench must of course engage with axial region 25*c* in such a way that it does not impede a relative motion of segments 22*a* and 22*b* along arrows R1 and R2 in FIG. 2. This relative motion occurs when the substantially cylindrical threaded rod 30 is screwed into passthrough opening 26 that is conical in portions. This radial motion is accomplished against the material elasticity of connecting configuration 32, in particular in the region of circumferential gap 24.

The embodiment on the right in FIGS. 1 and 2 will be described below. Components and component portions that are identical and functionally identical to the embodiment on the left in FIGS. 1 and 2 are labeled in the right embodiment with identical reference characters but incremented by 100. The second embodiment, on the right in FIGS. 1 and 2, will be described below only insofar as it differs from the first embodiment; for a description thereof, reference is otherwise expressly made also to the explanation of the second embodiment.

One substantial difference between the embodiments on the right and on the left in FIGS. 1 and 2 is the conformation of the connecting configuration. Connecting configuration 132 of fastening arrangement 110 encompasses an elastomeric connecting component 132*a* that spans circumferential gap 124 in a circumferential direction and is connected for motion together with both circumferential bounding walls that delimit segments 122a and 122b in a circumferential direction.

Additionally or alternatively, connecting configuration 132 can encompass a connecting land 132b embodied in one piece with segments 122a and 122b. It too spans circumferential gap 124.

Upon threading of threaded rod 130 into passthrough opening 126 that is conical in portions, the relative motion that occurs between segments 122a and 122b is the same as in the first embodiment. The difference is that the two segments 122a and 122b are displaced relative to one another along arrows R1 and R2 against the elastic shape inertia force of elastomeric connecting component 132a and/or of connecting land 132b connected in one piece to segments 122a and 122b.

In the course of this displacement, circumferential gap 24 or 124 becomes larger, and therefore so does the volume, i.e. passthrough opening 26 or 126, enclosed respectively by segments 22a, 22b and 122a and 122b.

A further difference is the physical conformation of positive engagement configuration 138, which is embodied as an engagement groove and is therefore capable of securing retention component 122 on metal sheet 118 in both possible axial directions on passthrough axis D.

Figure 3:
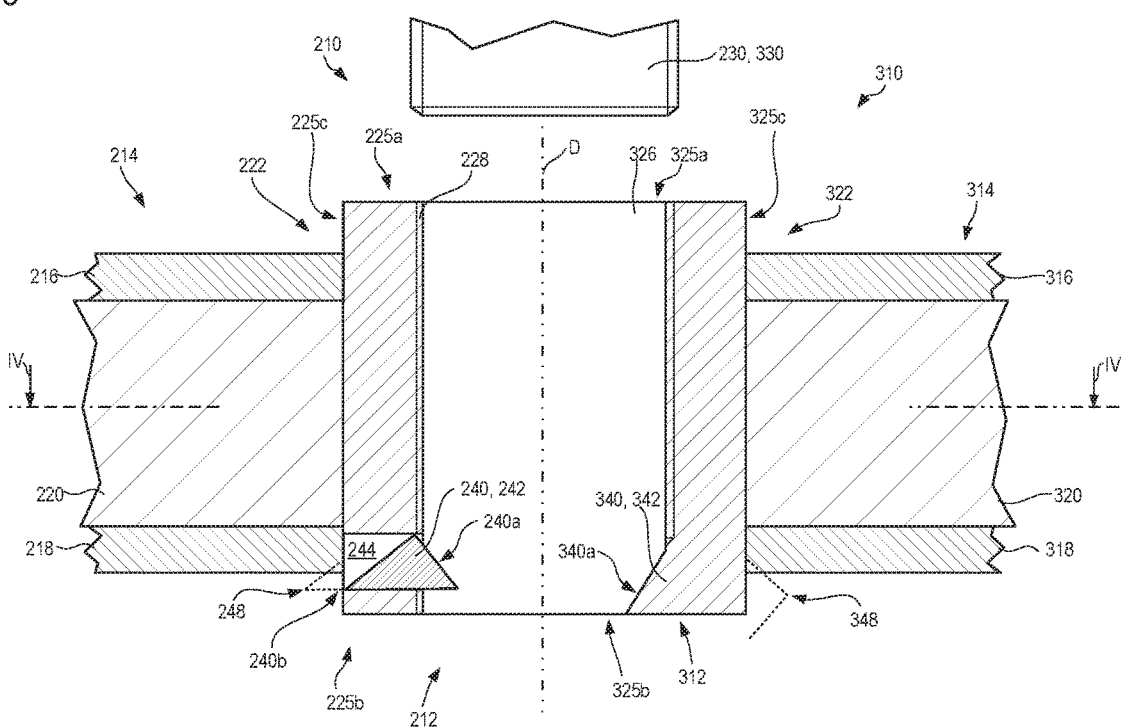
FIG. 3 is a longitudinal section view along section plane III-III in FIG. 4 which contains the passthrough axis, through two further embodiments of an insertion fastening arrangement according to the present invention having anchoring configurations displaceable orthogonally to the passthrough axis.

FIG. 3 is a longitudinal section view depicting, on the left side, a third embodiment of an insertion fastening arrangement 210 of the present invention. Components and component portions that are identical or functionally identical to the embodiment on the left in FIGS. 1 and 2 are labeled in the left embodiment of FIG. 3 with identical reference characters but incremented respectively by 100 or 200. The third embodiment, on the left in FIGS. 3 and 4, will be described below only insofar as it differs from the first two embodiments; for a description thereof, reference is otherwise expressly made also to the explanation of the second embodiment.

In contrast to the two previous embodiments, passthrough opening 226 of the third embodiment is not conical (even in portions), but is instead cylindrical. Conicity is not required because retention component 222 is not segmented but is instead a one-piece component similar to a modified nut.

In the third embodiment there is therefore no displacement of several segments of the one-piece retention component 222. Instead, an anchoring configuration 242, constituted as anchoring component 240 embodied separately from the remainder of retention component 222, becomes displaced radially outward along arrow R3 in the cross-sectional view of FIG. 4 and, in the displaced state, forms a radial protrusion 248 that projects radially outward from retention component 222 and is drawn with dashed lines in FIG. 3.

A recess 244, in which anchoring component 240 is radially displaceably received, is embodied for that purpose in retention component 222. The displacement itself is effected by threading threaded rod 230 into passthrough opening 226. Anchoring component 240 comprises for that purpose, at its radial end that projects in the undisplaced state into passthrough opening 226, an actuation bevel 240a. Upon threading of threaded rod 230 into passthrough opening 226, threaded rod 230 slides axially along actuation bevel 240a and pushes it, and anchoring component 240 along with it, radially outward in the direction of arrow R3. After this displacement, radial end 240b that is located farther from passthrough opening 226 projects radially beyond the external surface of retention component 222 and forms a radial protrusion.

Figure 4:
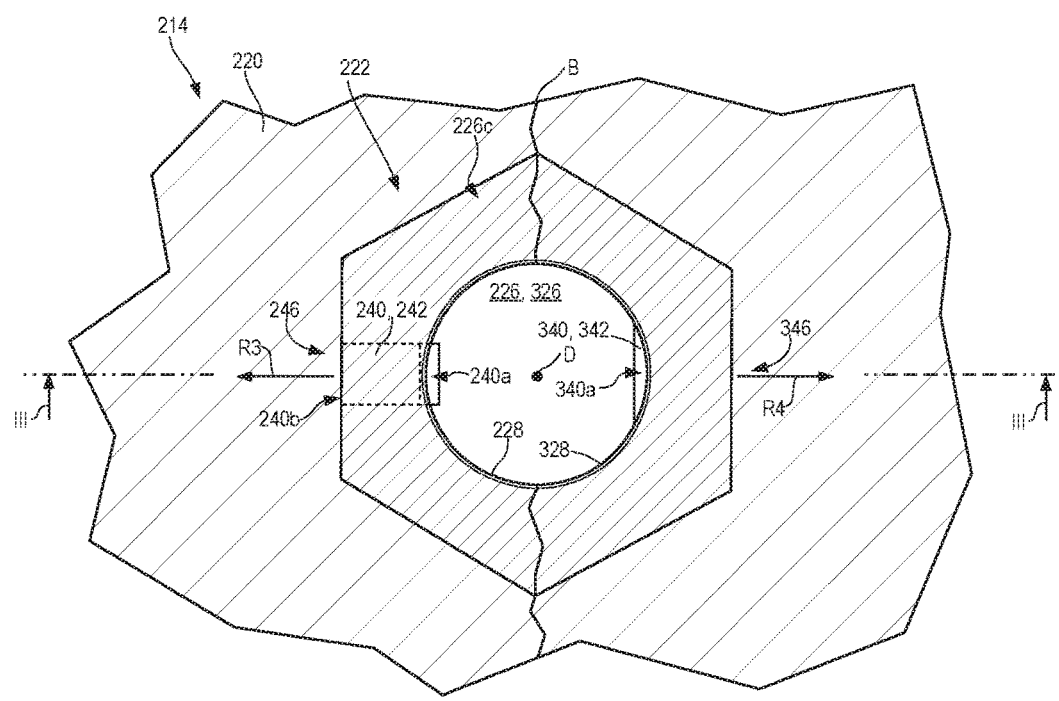
FIG. 4 is a cross-sectional view of the two embodiments of FIG. 3 along section plane IV-IV of FIG. 3 orthogonal to the passthrough axis.

FIG. 4 shows that anchoring configuration 242 is embodied as a separate anchoring component 240 only in a limited anchoring portion 246 along the circumference of retention component 222. Retention component 222 can, however, comprise several anchoring portions 246 distributed over its circumference. Additionally or alternatively, several anchoring configurations can also be provided at an axial distance from one another in the same anchoring portion 246, for example in order to secure retention component 222 axially on each of the two metal sheets 216 and 218.

The fourth embodiment on the right in FIGS. 3 and 4, in which components and component portions that are identical and functionally identical to the third embodiment are labeled with identical reference characters but incremented by 100, differs from the third embodiment substantially in that anchoring configuration 342 is embodied in one piece with the remainder of retention component 322. The fourth embodiment as well will be described only insofar as it differs from the previous first to third embodiments; for a description thereof, reference is made also to the explanation of the fourth embodiment.

Anchoring configuration 342 is embodied, in a circumferential portion or anchoring portion 346 visible in FIG. 4 and restrictedly thereto, as a material thickening that projects radially inward into passthrough opening 326 in the undisplaced or undeformed original state that is depicted in FIGS. 3 and 4. The material thickening forms a deformation portion 340.

Upon threading of threaded rod 330 into passthrough opening 326, threaded rod 330 pushes the material thickening out of the region of passthrough opening 326 radially outward in the direction of arrow R4 in FIG. 4. The result is to form a radial protrusion 348 that protrudes radially outward beyond the remainder of retention component 322 and secures retention component 322 axially on composite ply structure 314. This radial protrusion 348 is drawn with dashed lines in FIG. 3.

While considerable emphasis has been placed on the preferred embodiments of the invention illustrated and described herein, it will be appreciated that other embodiments, and equivalences thereof, can be made and that many changes can be made in the preferred embodiments without departing from the principles of the invention. Furthermore, the embodiments described above can be combined to form yet other embodiments of the invention of this application. Accordingly, it is to be distinctly understood that the foregoing descriptive matter is to be interpreted merely as illustrative of the invention and not as a limitation.

The invention claimed is:

1. A deformable insertion fastening arrangement embodied for insertion into and anchored to a planar metal sheet/plastic composite ply structure and for retention thereon by subsequent deformation; the planar metal sheet/plastic composite ply structure having a sandwich structure wherein a plastic ply is arranged between two metal sheets and the two metal sheets are spaced apart by a ply spacing, the planar metal sheet/plastic composite ply structure having an opening extending therethrough such that the two metal sheets have an inner metal circumferential edge and the plastic ply has an inner plastic ply circumferential edge forming the opening; the insertion fastening arrangement comprising a retention component having at least two portions that are radially displaceable relative to one another and that together form a passthrough opening passing through it along a passthrough axis and having a fastening configuration for fastening a further component thereonto; the passthrough axis defining an axial direction, radial directions orthogonal thereto, and a circumferential direction proceeding around the passthrough axis;

wherein at least one of:

the retention component, when considered in its undeformed initial state, is embodied segmentedly in a circumferential direction around the passthrough axis; at least two segments, constituting the radially displaceable portions, being connected to one another by at least one connecting configuration deformable in a circumferential direction; at least one of the at least two segments being displaceable in a radial direction away from the passthrough axis against an elastic force of the at least one connecting configuration, accompanied by enlargement of the passthrough opening, the at least one of the at least two segments having a radially extending segment portion having an axial segment portion length that is adapted to be equal to or less than the ply spacing wherein the displacement in the radial direction forces the radial extending segment portion into the inner plastic ply circumferential edge and into the plastic ply and the radially extending segment portion extending radially past the inner metal circumferential edges wherein the radially extending segment portion extends between the two metal sheets; and, the retention component, when considered in its undeformed initial state, comprises, in at least one anchoring portion delimited with reference to the overall dimension of the retention component in an axial direction and in a circumferential direction, an anchoring configuration that projects radially into the passthrough opening and is displaceable in the radial direction to form a radial protrusion on the radially outer side of the retention component that engages only one of the two metal sheets, wherein the at least one anchoring portion comprises a deformation portion embodied on the retention component in one-piece and materially continuous fashion.

2. The insertion fastening arrangement according to claim 1, wherein the at least one connecting configuration is integrally molded as one piece with the at least two segments connected by the at least one connecting configuration.

3. The insertion fastening arrangement according to claim 1, wherein the at least one connecting configuration is arranged in a circumferential direction between two circumferential bounding walls of two of the at least two segments that are directly adjacent in a circumferential direction.

4. The insertion fastening arrangement according to claim 1, wherein the at least one connecting configuration radially externally surrounds the retention component at least in portions.

5. The insertion fastening arrangement according to claim 1, wherein the at least one connecting configuration completely radially externally surrounds the retention component.

6. The insertion fastening arrangement according to claim 1, wherein the retention component comprises, on its external region that faces toward an associated composite ply structure in an inserted position, a positive engagement configuration for positive engagement with the associated composite ply structure.

7. The insertion fastening arrangement according to claim 1, wherein the retention component comprises, on its external region that faces toward an associated composite ply structure in an inserted position, on at least one of longitudinal ends of the retention component, a positive engagement configuration for positive engagement with an associated metal sheet of the associated composite ply structure.

8. The insertion fastening arrangement according to claim 1, wherein the retention component, when considered in its undeformed initial state, comprises, in at least one anchoring portion delimited with reference to the overall dimension of the retention component in an axial direction and in a circumferential direction, an anchoring configuration that projects radially into the passthrough opening and is displaceable in a radial direction, accompanied by formation of a radial protrusion on the radially outer side of the retention component, wherein the at least one anchoring portion comprises a deformation portion embodied on the retention component in one-piece and materially continuous fashion, and wherein the at least one anchoring portion comprises an anchoring component that is embodied separately from the retention component and is mounted radially displaceably therein.

9. The insertion fastening arrangement according to claim 1, wherein the at least one connecting configuration is a plurality of connecting configuration integrally molded as one piece with the at least two segments connected by the plurality of connecting configurations.

10. The insertion fastening arrangement according to claim 1, wherein the retention component, when considered in its undeformed initial state, comprises, in at least one anchoring portion delimited with reference to the overall dimension of the retention component in an axial direction and in a circumferential direction, an anchoring configuration that projects radially into the passthrough opening and is displaceable in a radial direction, accompanied by formation of a radial protrusion on the radially outer side of the retention component, wherein the at least one anchoring portion comprises a deformation portion embodied on the retention component in one-piece and materially continuous fashion, wherein the at least one anchoring portion comprises an actuation bevel which projects radially into the passthrough opening, wherein the anchoring portion is radially outward displaceable by the further component when introduced into the passthrough opening and wherein a displacement of the anchoring portion by the further component introduced into the passthrough opening is accompanied by formation of the radial protrusion.

11. The insertion fastening arrangement according to claim 8, wherein the at least one anchoring portion comprises an actuation bevel which projects radially into the passthrough opening and by which the further component introduced into the passthrough opening is displaceable radially outward accompanied by formation of the radial protrusion.

12. The insertion fastening arrangement according to claim 1, wherein the fastening configuration includes a thread; and the further component comprises a threaded-rod portion.

13. The insertion fastening arrangement according to claim 12, wherein the passthrough opening is embodied conically at least over an axial portion.

14. The insertion fastening arrangement according to claim 1, wherein the passthrough opening is embodied conically at least over an axial portion.

* * * * *